US 6,590,861 B1

(12) United States Patent
Vepa et al.

(10) Patent No.: US 6,590,861 B1
(45) Date of Patent: Jul. 8, 2003

(54) COMBINING VIRTUAL LOCAL AREA NETWORKS AND LOAD BALANCING WITH FAULT TOLERANCE IN A HIGH PERFORMANCE PROTOCOL

(75) Inventors: RamKrishna Vepa, Danville, CA (US); Roman Baker, San Jose, CA (US); Sameer Nanda, Sunnyvale, CA (US); James Binder, San Jose, CA (US); Thomas Albert Maufer, Santa Clara, CA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/272,083

(22) Filed: Mar. 18, 1999

(51) Int. Cl.[7] ................................................. H04J 1/16
(52) U.S. Cl. .................... 370/216; 370/218; 370/230; 370/242; 709/238
(58) Field of Search ................................ 370/471, 401, 370/402, 216, 217, 218, 241, 242, 244, 245, 250, 392, 463, 466; 709/223, 224, 238, 105, 235, 250

(56) References Cited

U.S. PATENT DOCUMENTS

| | | | | |
|---|---|---|---|---|
| 5,394,402 A | * | 2/1995 | Ross .......................... | 370/402 |
| 5,864,535 A | * | 1/1999 | Basilico ...................... | 370/392 |
| 5,918,021 A | * | 6/1999 | Aditya ........................ | 709/235 |
| 6,049,528 A | * | 4/2000 | Hendel et al. ............... | 370/235 |
| 6,052,733 A | * | 4/2000 | Mahalingam et al. ........ | 709/235 |
| 6,151,297 A | * | 11/2000 | Congdon et al. ............ | 370/216 |

OTHER PUBLICATIONS

Sarparanta, Fault Tolerance—Requirements and Solutions, Helsinki Unversity of Technology, pp. 1–12, May 3, 1998.*
Decisys, The Viertual LAN Technology Report, pp. 1–20, May 1996.*
Liu, Support for 802.1Q/802.1p in the Catalyst 5500/5000 System, Cisco Systems, Inc., pp. 1–17, Sep. 1998.*

* cited by examiner

Primary Examiner—Seema S. Rao
Assistant Examiner—Frank Duong
(74) Attorney, Agent, or Firm—Wagner Murabito & Hao LLP

(57) ABSTRACT

A method to send and receive data packets over a network of computer systems (e.g., a plurality of virtual local area networks [VLANs] compliant with the IEEE 802.1Q standard) using a server computer system adapted to have a plurality of network interface cards (NICs) coupled thereto. An outgoing data packet is addressed using a first media access control (MAC) address, wherein the first MAC address is a virtual MAC address representing the plurality of NICs. A NIC is selected from the plurality of NICs using a load balancing scheme. The functionality of the selected NIC is verified using a fault tolerance scheme. The first MAC address in the outgoing data packet is replaced with a second MAC address, wherein the second MAC address represents the selected NIC. The outgoing data packet is then transmitted using the selected NIC. For an incoming data packet received at one of the plurality of NICs, the existing MAC address in the incoming data packet is replaced with the first MAC address. Thus, the present embodiment of the present invention provides a high performance method that supports multiple VLANs and elegantly combines a load balance scheme and a fault tolerance scheme into a software element implemented on a server computer system.

27 Claims, 10 Drawing Sheets

COMBINING VIRTUAL LOCAL AREA NETWORKS AND LOAD BALANCING WITH FAULT TOLERANCE IN A HIGH PERFORMANCE PROTOCOL

TECHNICAL FIELD

The present invention relates to the field of computer system networks. In particular, the present invention pertains to a software-based module for augmenting a server computer system to perform network interface card load balancing and fault tolerance.

BACKGROUND ART

Computer systems linked to each other in a network are commonly used in businesses and other organizations. Computer system networks ("networks") provide a number of benefits for the user, such as increased productivity, flexibility, and convenience as well as resource sharing and allocation.

Networks are configured in different ways depending on implementation-specific details such as the hardware used and the physical location of the equipment, and also depending on the particular objectives of the network. In general, networks include one or more server computer systems, each communicatively coupled to numerous client computer systems.

One common type of network configuration includes a number of virtual local area networks (VLANs). VLANs provide numerous advantages, a primary advantage being that the client computer systems associated with a particular server computer system do not need to all be in the same physical location.

In contemporary networks, server computer systems are typically coupled to the network using more than one network interface card (NIC). Multiple NICs increase the total available bandwidth capacity for transmitting and sending data packets. Multiple NICs also provide resiliency and redundancy if one of the NICs fails. In the case of a failure of a NIC, one of the other NICs is used to handle the traffic previously handled by the failed NIC, thereby increasing overall system reliability. Therefore, the client computer systems in communication with the server computer system through a particular NIC are not cut off from the server should that NIC fail.

Accordingly, it is necessary to be able to detect when a NIC fails and, when a failed NIC is detected, to switch to a functioning NIC (this is referred to as fault tolerance). Also, it is desirable to balance the traffic over each NIC so that one NIC doesn't handle too much traffic and become a bottleneck (this is referred to as load balancing). Furthermore, it is desirable that the fault tolerance and load balancing schemes support a computer system network comprised of multiple VLANs.

Prior Art FIG. 1 is an illustration of exemplary network 50 including two VLANs. In network 50, client computer system 140 (e.g., a workstation) is in one VLAN, and client computer systems 141, 142 and 143 are in a second VLAN. Both VLANs are serviced by server computer system 160. A data packet sent by server computer system 160 contains address information that is used to identify the particular client computer system(s) to which the data packet is to be sent. In addition, the data packet is tagged with a VLAN identifier that identifies the destination VLAN. The methods for addressing a data packet in a network comprising multiple VLANs are well known in the art; one method is defined by the IEEE 802.1Q standard.

Switches 150 and 151 are able to read the VLAN identifier and the other address information contained in the data packet and direct the data packet accordingly. Thus, switch 150 reads the VLAN identifier and will direct the data packet to client computer system 140 if appropriate. Otherwise, the data packet proceeds to switch 151, which directs the data packet to the proper client computer system (e.g., client computer systems 141, 142 or 143) depending on the address information contained in the data packet.

One prior art technique for fault tolerance and load balancing utilizes a switch-dependent protocol implemented using server computer system 160 and switches 150 and 151. This prior art technique also requires NICs that are specifically designed for compatibility with switches 150 and 151 and the protocol being used. This prior art technique is problematic because it requires the use of a specific protocol with a specific type of hardware (e.g., a specific type of NIC compatible with a specific type of switch). Thus, this prior art technique is not suitable for different types of hardware (e.g., NICs and switches) and protocols. In particular, the prior art is not suitable for legacy hardware already present in a network.

Another drawback to this type of prior art technique is that the switch must be designed with the capability to implement the fault tolerance and load balancing schemes. Thus, the complexity and the cost of the switch are substantially increased. Even so, the capabilities of the switch are relatively limited, and so the schemes for providing fault tolerance and load balancing are also limited. In addition, the cost of implementing this type of prior art technique is increased by the need to replace or upgrade legacy devices.

Accordingly, a need exists for a system and method that integrate fault tolerance and load balancing in a multiple VLAN environment wherein the system and method are not limited by the capabilities of a switch. A need also exists for a system and method that satisfy the above need, are switch-independent, and can be used with legacy hardware (e.g., switches and NICs). A need further exists for a system and method that satisfy the above needs and can be used with the protocols used by the server computer system.

DISCLOSURE OF THE INVENTION

The present invention provides a system and method that integrate fault tolerance and load balancing in a multiple VLAN environment wherein the system and method are not limited by the capabilities of a switch. The present invention also provides a system and method that satisfy the above need, are switch-independent, and can be used with legacy hardware (e.g., switches and NICs). In addition, the present invention provides a system and method that satisfy the above needs and can be used with the protocols used by the server computer system.

Specifically, in one embodiment, the present invention pertains to a software module implemented on the server computer system and used to send and receive data packets over a network of computer systems using a plurality of network interface cards (NICs) coupled to the server computer system. An outgoing data packet is addressed using a first media access control (MAC) address, wherein the first MAC address is a virtual MAC address representing the plurality of NICs. A NIC is selected from the plurality of NICs using a load balancing scheme. The functionality of the selected NIC is verified using a fault tolerance scheme. The first MAC address in the outgoing data packet is replaced with a second MAC address, wherein the second MAC address represents the selected NIC. The outgoing data packet is then transmitted using the selected NIC. For an incoming data packet received at one of the plurality of NICs, the existing MAC address in the incoming data packet is replaced with the first MAC address.

In the present embodiment, the present invention is utilized with a network of computer systems comprising a plurality of virtual local area networks (VLANs) compliant with the IEEE 802.1Q standard.

Other embodiments of the present invention include one or more of the following additional features: class of service, wherein a priority is assigned to each of the data packets, compatibility with GARP (generic attributes registration protocol) multicast registration protocol (GMRP), compatibility with GARP VLAN registration protocol (GVRP), and compatibility with Fast Internet Protocol (FIP). The present embodiment of the present invention is implemented in the server computer system as a module, and therefore snap-in modules can be used to update and enhance the present embodiment with other features.

The present invention provides a high performance system and method that support multiple VLANs and elegantly combine a load balance scheme and a fault tolerance scheme into a software element implemented on a server computer system.

These and other objects and advantages of the present invention will become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, bytes, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "addressing" or "selecting" or "verifying" or "replacing" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
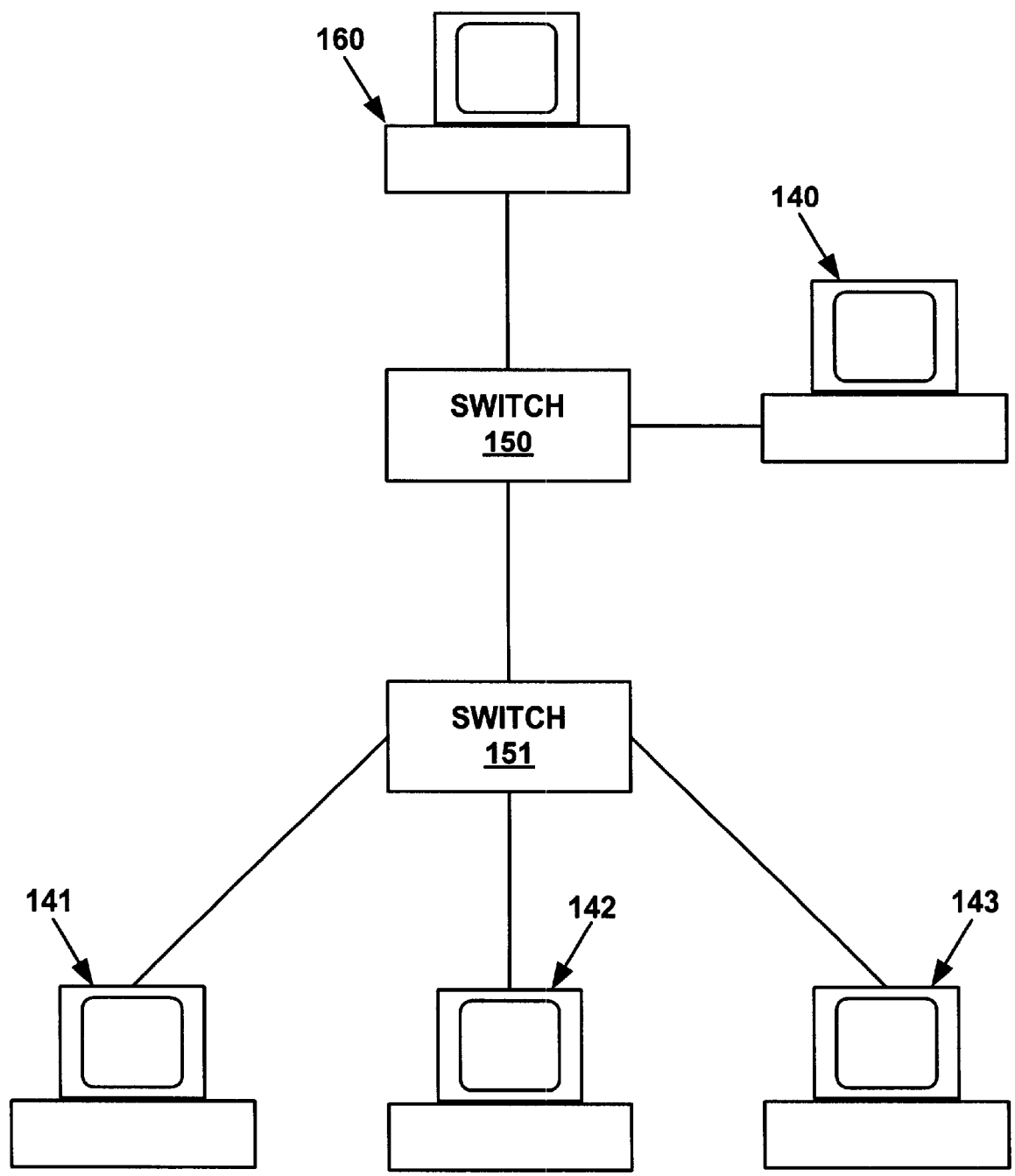
FIG. 1 is a block diagram of an exemplary computer system network of the prior art.
Figure 2:
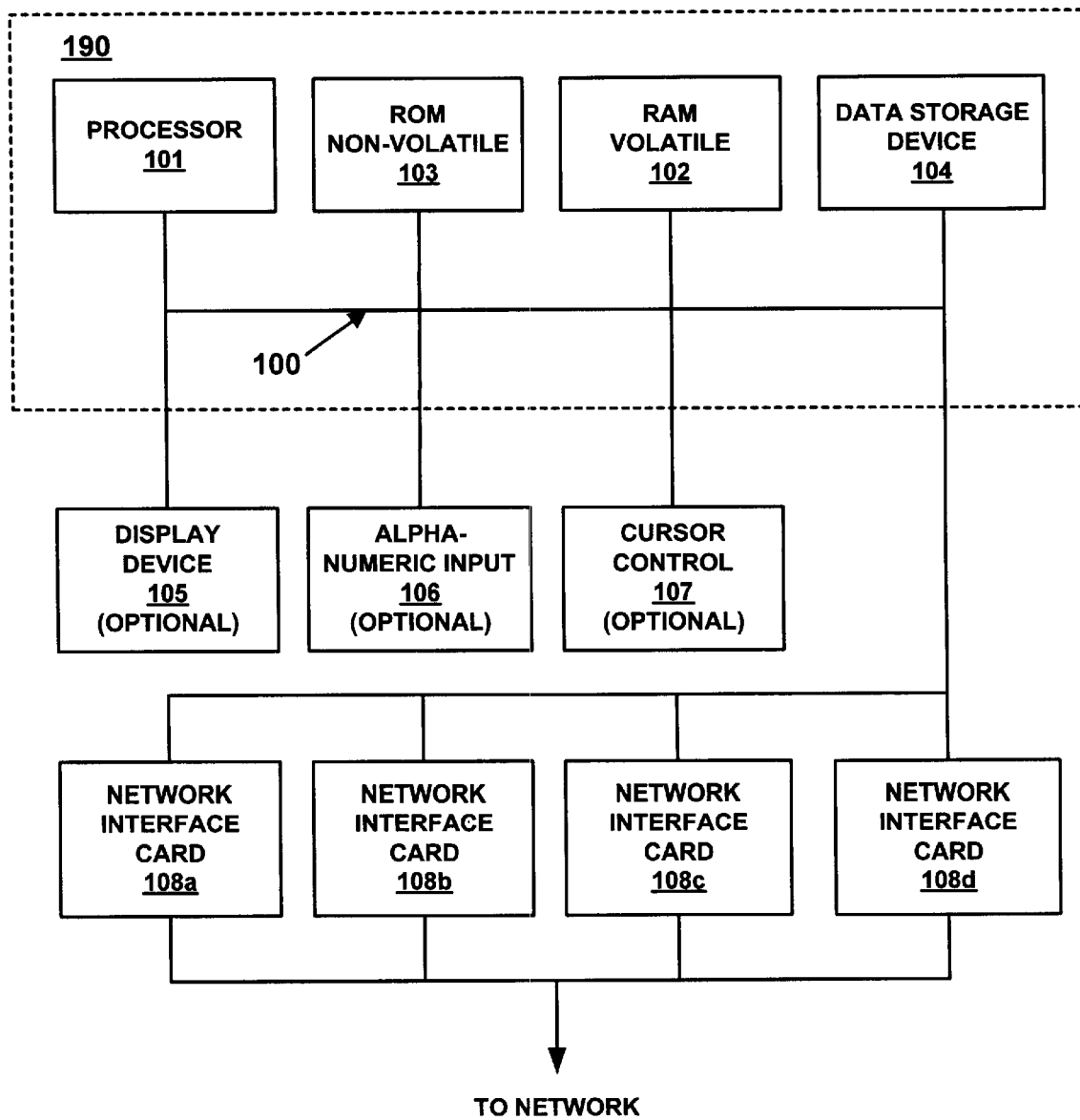
FIG. 2 shows a general purpose server computer system upon which embodiments of the present invention may be implemented.

Refer to FIG. 2 which illustrates an exemplary server computer system 190 upon which embodiments of the present invention may be practiced. Server computer system 190 is communicatively coupled to other computer systems (not shown) in a network. In one embodiment, server computer system 190 is compliant with IEEE standard 802.1Q.

In general, server computer system 190 used by the embodiments of the present invention comprises a bus 100 for communicating information, a central processor 101 coupled with bus 100 for processing information and instructions, a random access memory 102 coupled with bus 100 for storing information and instructions for central processor 101, a read-only memory 103 coupled with bus 100 for storing static information and instructions for central processor 101, a data storage device 104 such as a magnetic or optical disk and disk drive coupled with bus 100 for storing information and instructions, an optional display device 105 coupled to bus 100 for displaying information to the computer user, an optional alphanumeric input device 106 including alphanumeric and function keys coupled to bus 100 for communicating information and command selections to central processor 101, and an optional cursor control device 107 coupled to bus 100 for communicating user input information and command selections to central processor 101.

Display device 105 of FIG. 2 utilized with server computer system 190 of the present embodiment may be a liquid crystal device, cathode ray tube, or other display device suitable for creating graphic images and alphanumeric characters recognizable to the user. Cursor control device 107 allows the computer user to dynamically signal the two-dimensional movement of a visible symbol (pointer) on a display screen of display device 105. Many implementations of the cursor control device are known in the art including a trackball, mouse, joystick or special keys on alphanumeric input device 106 capable of signaling movement of a given direction or manner of displacement. It is to be appreciated that the cursor control device 107 also may be directed and/or activated via input from the keyboard using special keys and key sequence commands. Alternatively, the cursor may be directed and/or activated via input from a number of specially adapted cursor directing devices.

Continuing with reference to FIG. 2, server computer system 190 is adapted to be coupled via bus 100 to a plurality of network interface cards (NICs) exemplified by NICs 108a, 108b, 108c and 108d. NICs 108a–d provide the physical communication link between server computer system 190 and a network of client computer systems and other server computer systems (not shown). Any of a number of different and well known types of NICs may be used to communicate with the network of client and server computer systems. It is appreciated that any number of NICs may be utilized in accordance with the present invention. It is further appreciated that NICs 108a–d may be integrated into server computer system 190 or they may be externally coupled to server computer system 190.

Figure 3:
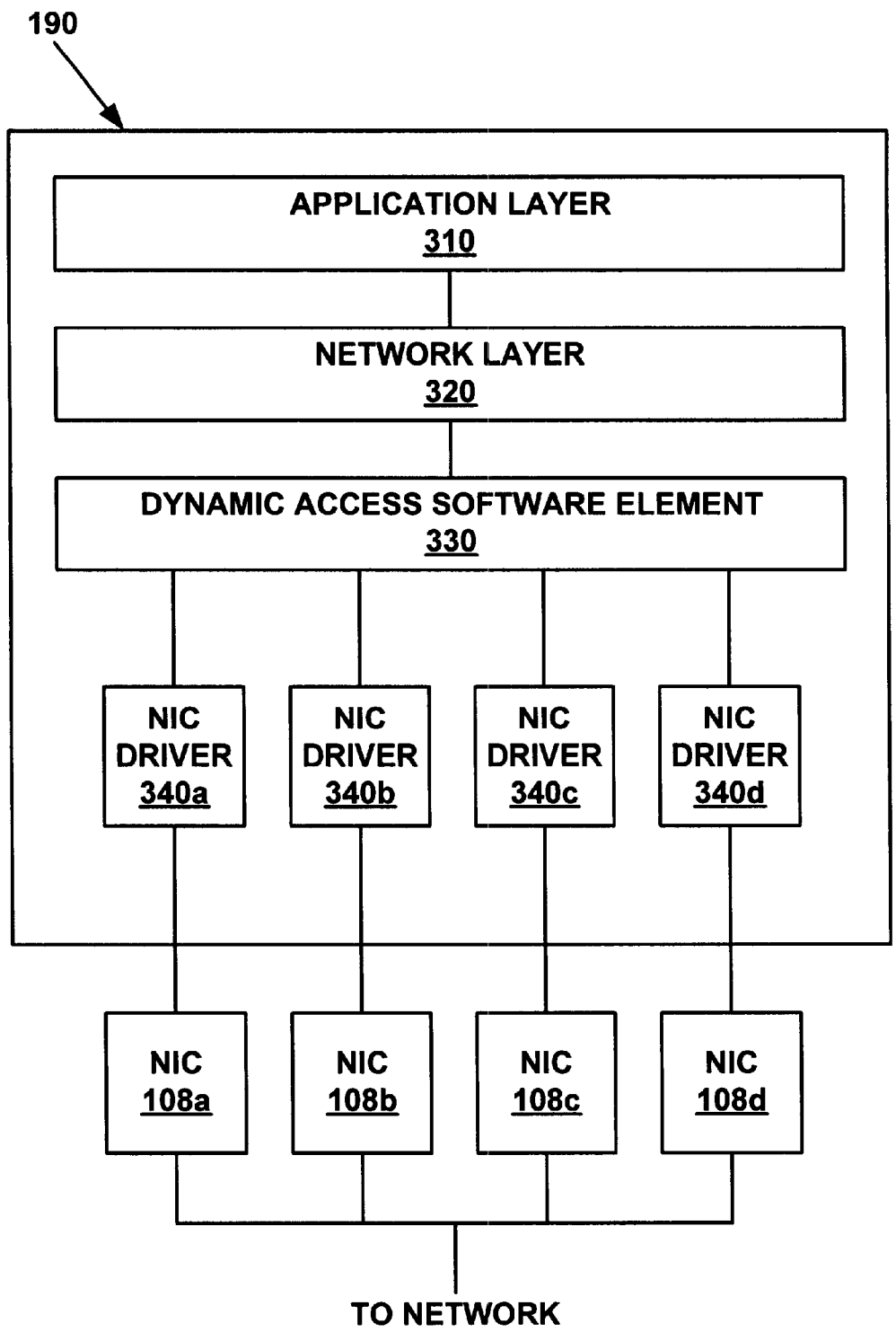
FIG. 3 is a hardware and software data flow diagram of the logical components of the server computer system of FIG. 2 in accordance with one embodiment of the present invention.

FIG. 3 is a hardware and software data flow diagram of the logical components of server computer system 190 in accordance with one embodiment of the present invention. In the present embodiment, application layer 310 and network layer 320 are software elements having the functions and responsibilities defined by the well-known International Standards Organization/Open System Interconnection (ISO/OSI) reference model; however, it is appreciated that the present invention is not limited to this type of configuration or the ISO/OSI reference model. Application layer 310 and network layer 320 constitute a portion of the software elements in server computer system 190 commonly referred to as the protocol stack; it is understood that for simplicity only the relevant layers of the ISO/OSI reference model are shown in FIG. 3.

In the present embodiment, application layer 310 defines the manner in which application programs (e.g., computer software programs, word processors, database management systems, electronic mail, and the like) interact with the communication network. Network layer 320 contains the computer-to-computer or computer-to-network protocol that defines the procedures to be followed when data packets are transmitted and received. The protocols used by network layer 320 include, for example, IP (Internet Protocol), IPX (Internetwork Packet Exchange), or other protocols known in the art. Network layer 320 is responsible for determining addresses or for translating hardware addresses to network addresses.

Continuing with reference to FIG. 3, in the present embodiment server computer system 190 is adapted to have a plurality of NICs; for illustration purposes, only four NICs 108a–d are shown, although it is appreciated that any number of NICs may be used in accordance with the present invention. Associated with each of NICs 108a–d are NIC drivers 340a–d, respectively. In the ISO/OSI reference model, NICs 108a–d correspond to the physical layer and NIC drivers 340a–d correspond to the data-link layer. NIC drivers 340a–d provide an interface for the protocols of network layer 320. NIC drivers 340a–d also provide media access control; that is, they provide access to the particular physical encoding and transport scheme used by NICs 108a–d. As described above, NICs 108a–d provide the physical connection to the network. Each of NICs 108a–d has a unique media access control (MAC) address.

In one embodiment, the present invention is a software element (e.g., dynamic access software element 330) introduced into server computer system 190 between network layer 320 and NIC drivers 340a–d. As such, dynamic access software element 330 is positioned to intercept all data packets sent and received by server computer system 190, as well as all other like transactions such as requests, sets and gets. In the present embodiment, dynamic access software element 330 is a software-based protocol containing a load balancing scheme and a fault tolerance scheme that are enabled when multiple NICs are being used by a server computer system.

The load balancing scheme is used to select one of the NICs that will be used to transmit and receive data packets. The fault tolerance scheme is used to determine whether the selected NIC is functioning, and to automatically substitute one of the other NICs in case the selected NIC is not functioning. Various load balancing schemes and fault tolerance schemes can be implemented in accordance with the present invention.

In alternate embodiments, dynamic access software element 330 incorporates other features such as class of service (for assigning a priority to outgoing data packets), multicast registration, and support of virtual local area networks (VLANs) compliant with IEEE standard 802.1Q. Because of its strategic location in the protocol stack of server computer system 190, additional features may be readily incorporated into dynamic access software element 330 using snap-in software modules.

By integrating dynamic access software element 330 into server computer system 190, the present embodiment of the present invention takes advantage of the abundant resources (e.g., processing power and memory) available in a server computer system. The present invention is also compatible with the protocols used by server computer system 190. In addition, because dynamic access software element 330 is incorporated entirely into server computer system 190, it is switch-independent and thus can be used with different types of switches including legacy devices. Correspondingly, the present invention eliminates the need for complex switches and the specific protocols used with those switches. As will be seen by the discussion below, there are a number of other advantages associated with the present invention.

Dynamic access software element 330 is a multi-threaded, full duplex, and true deserialized driver that supports multiple NICs. Dynamic access software element 330 consists of a protocol and a MAC driver. In accordance with the present embodiment of the present invention, a virtual MAC is created by dynamic access software element 330 for each VLAN included in the computer system network. Similarly, a virtual MAC can correspond to a unique IP and subnet address. Each virtual MAC is bound both to dynamic access software element 330 and to network layer 320 (herein, "bound" and "binding" refer to a link between two software entities). Dynamic access software element 330 is also bound to each NIC. Additional details regarding dynamic access software element 330 are provided below with regard to FIGS. 5A–5D.

Continuing with reference to FIG. 3, dynamic access software element 330 is compatible with contemporary software and operating systems such as NT 3.51 and NT 4.0, but it is not limited to these applications and is adaptable to future software and operating systems. Dynamic access software element 330 is designed with defined application program interfaces for interfacing with the snap-in modules that provide additional features. Thus, dynamic access software element 330 can be readily updated and enhanced with additional or improved features.

Figure 4:
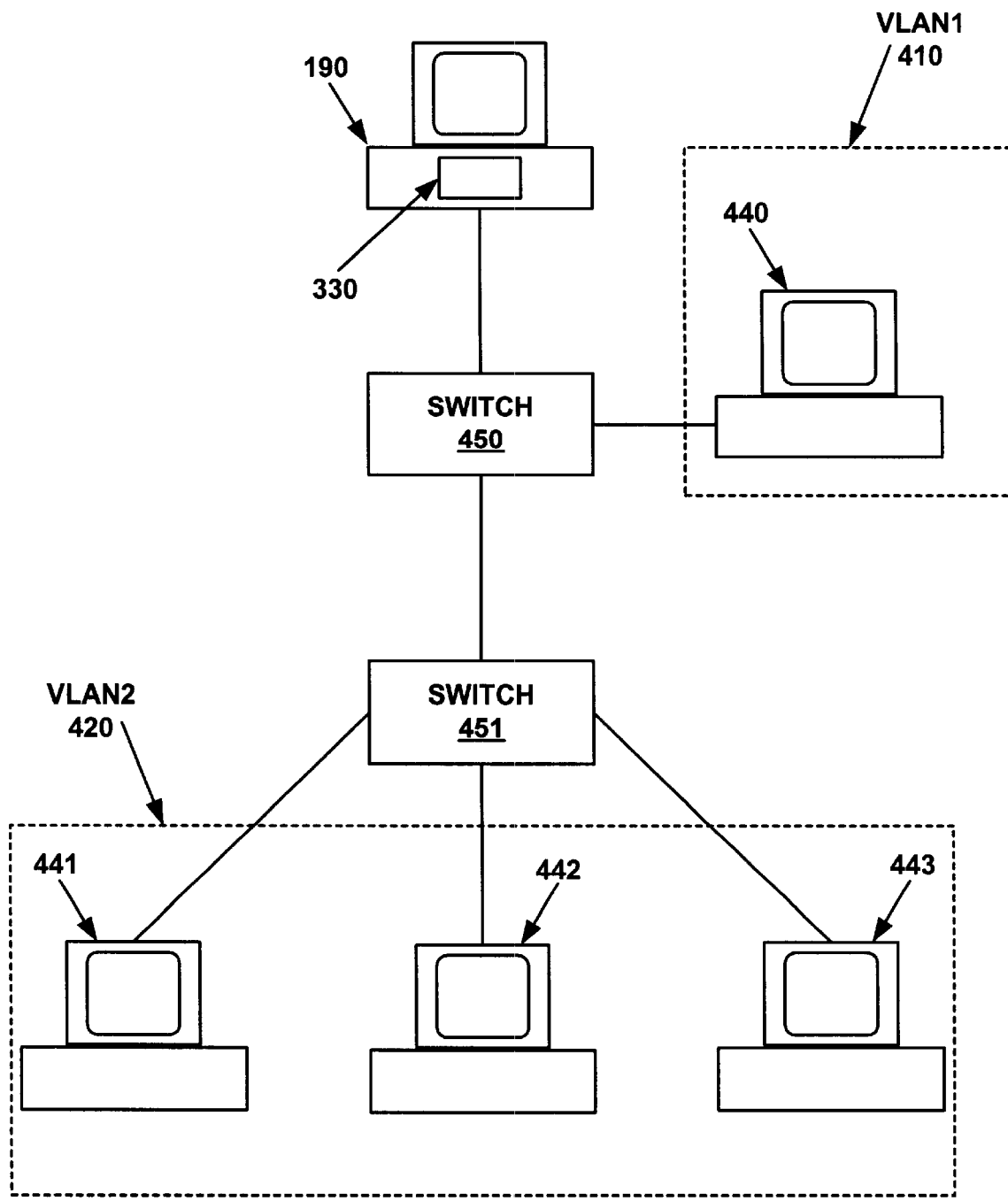
FIG. 4 is a block diagram of an exemplary computer system network including the server computer system of FIG. 2 upon which embodiments of the present invention may be implemented.

FIG. 4 is a block diagram of an exemplary network 400 comprised of server computer system 190 incorporating dynamic access software element 330 and coupled to VLAN1 410 and VLAN2 420 via switches 450 and 451. VLAN1 410 is comprised of client computer system 440, and VLAN2 420 is comprised of client computer systems 441, 442 and 443. In this embodiment, network 400 is compliant with IEEE standard 802.1Q. It is appreciated that other network configurations made up of different numbers of components may be utilized in accordance with the present invention. In accordance with the present invention, switches 450 and 451 may be any of a variety of well known switches.

FIGS. 5A, 5B, 5C and 5D represent the software configuration of server computer system 190 (FIGS. 2–4) for various implementations of one embodiment of the present invention. These figures indicate the direction of an outgoing data packet from server computer system 190; it is understood that the direction of an incoming data packet is the opposite of that indicated in FIGS. 5A–D. All requests, sets and gets also follow the paths indicated. It is also appreciated that for simplicity of discussion, only one or two NICs and one or two VLANs are presented; however, any number of NICs and VLANs may be utilized in accordance with the present invention.

Figure 5A:
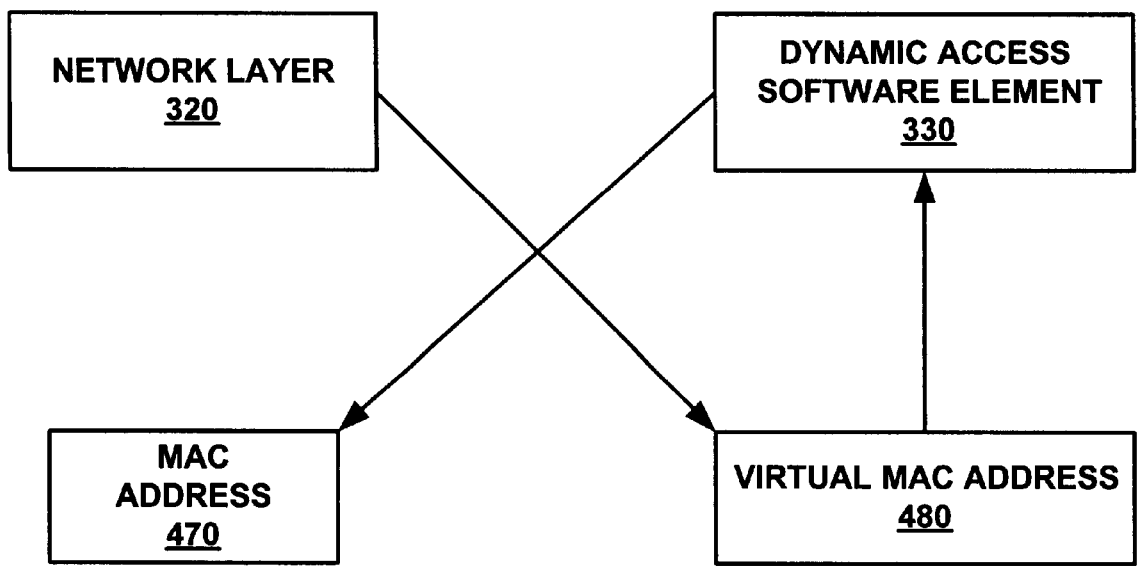
FIGS. 5A, 5B, 5C and 5D are block diagrams of the software configuration of the server computer system of FIG. 2 in accordance with one embodiment of the present invention.

With reference to FIG. 5A, server computer system 190 (FIGS. 2–4) has a single NIC coupled thereto represented by MAC address 470, and the network comprises a single VLAN.(e.g., VLAN1 410 of FIG. 4). In one embodiment, with one NIC, load balancing and fault tolerance are not enabled. In accordance with the present embodiment of the present invention, dynamic access software element 330 creates virtual MAC address 480 which corresponds to VLAN1 410. Virtual MAC address 480 is registered with the NDIS (Network Driver Interface Specification) wrapper. Accordingly, network layer 320 is bound to virtual MAC address 480, which in turn is bound to dynamic access software element 330, which in turn is bound to MAC address 470. Hence, network layer 320 is not bound directly to MAC address 470 except through virtual MAC address 480 and dynamic access software element 330.

Figure 5B:
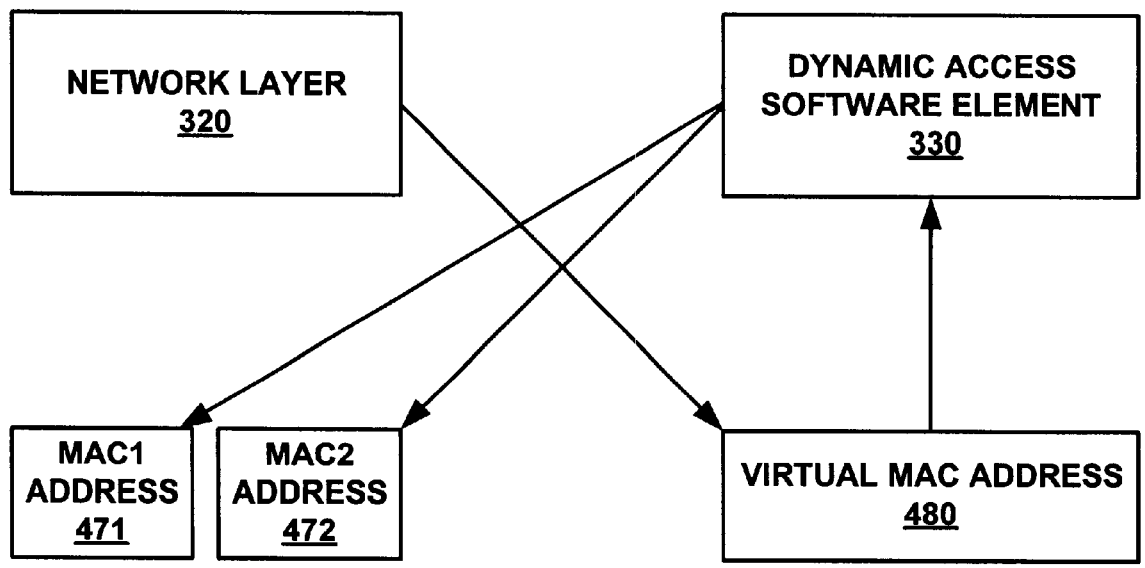

With reference to FIG. 5B, server computer system 190 has two NICs coupled thereto represented, respectively, by MAC1 address 471 and MAC2 address 472. The network comprises a single VLAN (e.g., VLAN1 410). With multiple NICs, load balancing and fault tolerance are enabled in accordance with the present invention. Dynamic access software element 330 creates virtual MAC address 480 corresponding to VLAN1 410. Virtual MAC address 480 is registered with the NDIS wrapper. Accordingly, network layer 320 is bound to virtual MAC address 480, which in turn is bound to dynamic access software element 330, which in turn is bound to MAC1 address 471 and MAC2 address 472. Hence, network layer 320 is not bound directly to MAC1 address 471 and MAC2 address 472 except through virtual MAC address 480 and dynamic access software element 330.

Continuing with reference to FIG. 5B, virtual MAC 480 represents both MAC1 address 471 and MAC2 address 472 to network layer 320. That is, from the perspective of network layer 320, the NICs appear to be a single NIC with a single MAC address (the virtual MAC address). Thus, network layer 320 specifies a single MAC address (the virtual MAC address) in an outgoing data packet. Dynamic access software element 330 executes a load balancing scheme to select one of the NICs to be used to transmit the outgoing data packet. Dynamic access software element 330 also executes a fault tolerance scheme to determine whether the selected NIC is functioning; if not, a different NIC is substituted for the selected NIC. Dynamic access software element 330 then converts the virtual MAC address (the address specified by network layer 320) into the MAC address corresponding to the NIC that will be used to transmit the data packet. Additional details are provided below in conjunction with FIGS. 6 and 7.

Thus, dynamic access software element 330 is able to implement a load balancing scheme and a fault tolerance scheme in server computer system 190 without having to modify the protocol utilized by network layer 320 (e.g., IP, IPX, etc.). Other features (e.g., snap-ins) such as class of service and multicast registration can also be implemented via dynamic access software element 330 without affecting network layer 320.

Figure 5C:
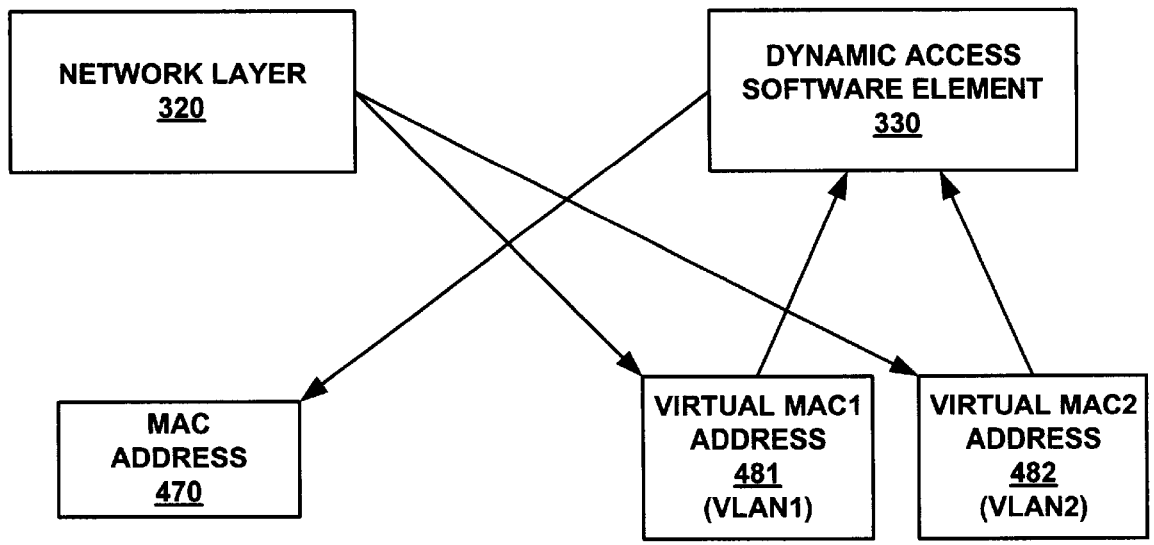

With reference to FIG. 5C, server computer system 190 has one NIC coupled thereto represented by MAC address 470, and the network comprises two VLANs (e.g., VLAN1 410 and VLAN2 420 of FIG. 4). In one embodiment, with one NIC, load balancing and fault tolerance are not enabled. In accordance with the present embodiment of the present invention, dynamic access software element 330 creates virtual MAC1 address 481 and virtual MAC2 address 482 which correspond to VLAN1 410 and VLAN2 420, respectively. Virtual MAC1 address 481 and virtual MAC2 address 482 are registered with the NDIS wrapper. Accordingly, network layer 320 is bound to both virtual MAC1 address 481 and virtual MAC2 address 482, which in turn are bound to dynamic access software element 330, which in turn is bound to MAC address 470.

Each VLAN in the network is represented by a unique VLAN identifier per IEEE standard 802.1Q. Thus, in accordance with the present embodiment of the present invention, each unique VLAN identifier is also represented by a virtual MAC address. Correspondingly, the group of NICs represented by each virtual MAC address is associated with a unique VLAN identifier.

In the outgoing data packet, network layer 320 specifies the virtual MAC address corresponding to the VLAN that is the destination of the outgoing data packet, and dynamic access software element 330 inserts the actual VLAN identifier for that VLAN. In this manner, the present invention provides the capability to support multiple VLANs. Additional details are provided below in conjunction with FIGS. 6 and 7.

Figure 5D:
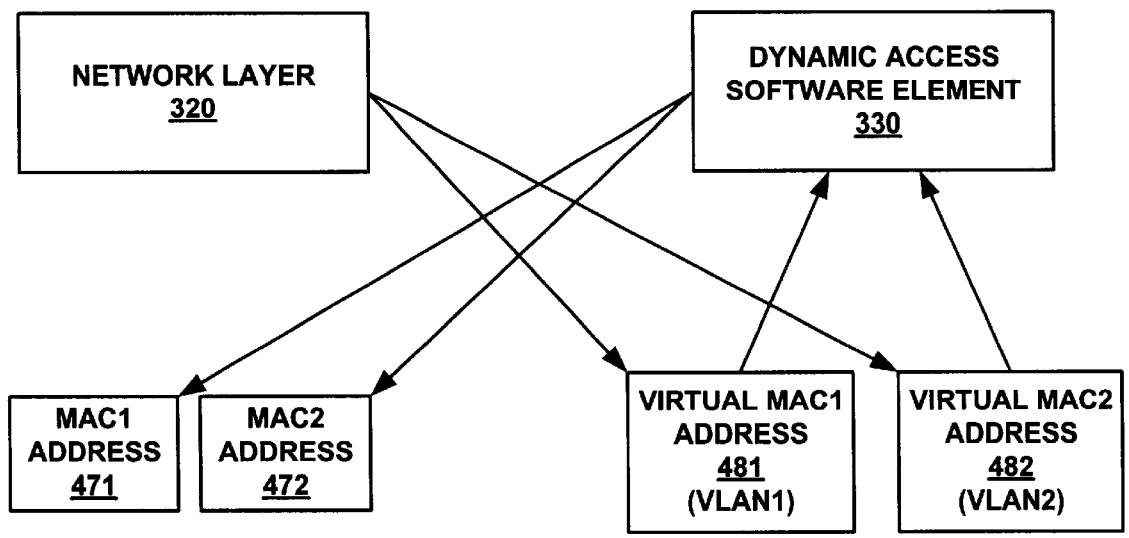

With reference to FIG. 5D, server computer system 190 has two NICs coupled thereto represented by MAC1 address 471 and MAC2 address 472, respectively. The network comprises two VLANs (e.g., VLAN1 410 and VLAN2 420). With multiple NICs, load balancing and fault tolerance are enabled. In accordance with the present embodiment of the present invention, dynamic access software element 330 creates virtual MAC1 address 481 and virtual MAC2 address 482 which correspond to VLAN1 410 and VLAN2 420, respectively. Virtual MAC1 address 481 and virtual MAC2 address 482 are registered with the NDIS wrapper. Accordingly, network layer 320 is bound to both virtual MAC1 address 481 and virtual MAC2 address 482, which in turn are bound to dynamic access software element 330, which in turn is bound to MAC1 address 471 and MAC2 address 472.

Continuing with reference to FIG. 5D, a first virtual MAC address represents both MAC1 address 471 and MAC2 address 472 to network layer 320. That is, from the perspective of network layer 320, the NICs appear to be a single NIC with a single MAC address (the first virtual MAC address). Thus, network layer 320 specifies a single MAC address (the first virtual MAC address) in an outgoing data packet. Network layer 320 also specifies a second virtual MAC address corresponding to the VLAN that is the destination of the outgoing data packet. Dynamic access software element 330 executes a load balancing scheme to select one of the NICs to be used to transmit the outgoing data packet. Dynamic access software element 330 also executes a fault tolerance scheme to determine whether the selected NIC is functioning; if not, a different NIC is substituted for the selected NIC. Dynamic access software element 330 then converts the first virtual MAC address (the address specified by network layer 320) into the MAC address corresponding to the NIC that will be used to transmit the data packet. Dynamic access software element 330 also inserts the actual VLAN identifier for the destination VLAN. Additional details are provided below in conjunction with FIGS. 6 and 7.

Thus, dynamic access software element 330 is able to implement a load balancing scheme and a fault tolerance scheme in server computer system 190 without having to modify the protocol utilized by network layer 320 (e.g., IP, IPX, etc.). Other features such as class of service and multicast registration can also be incorporated into dynamic access software element 330. In addition, dynamic access software element 330 is able to accomplish this for a network comprising multiple VLANs.

Figure 6:
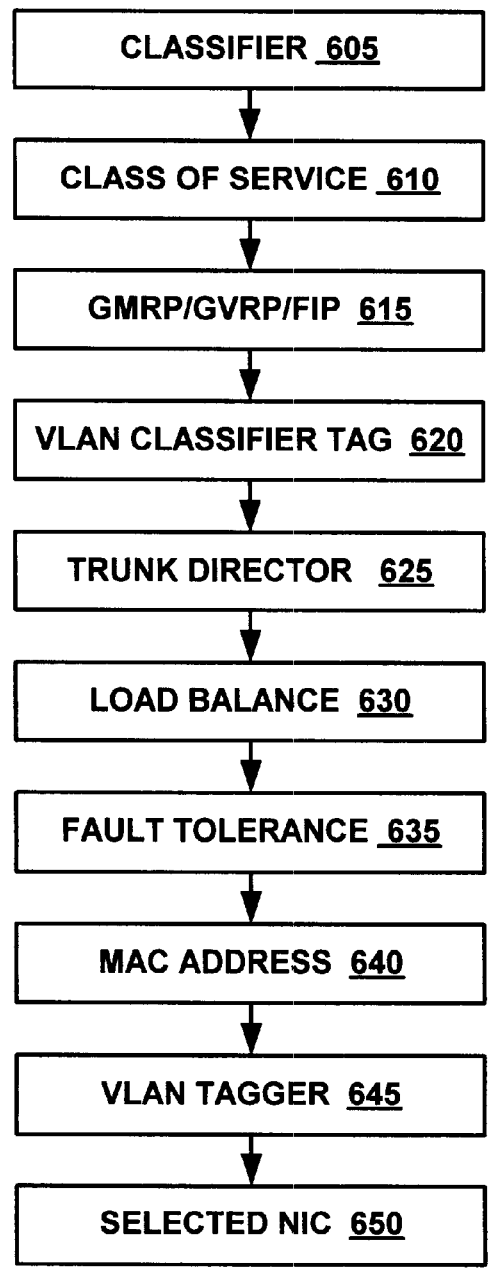
FIG. 6 is a flowchart of one embodiment of the process executed for an outgoing data packet in accordance with the present invention.

FIG. 6 is a flowchart of one embodiment of process 600 executed by dynamic access software element 330 for an outgoing data packet in accordance with the present invention. Process 600 includes a number of features that can be implemented by dynamic access software element 330; however, it is appreciated that in alternate embodiments a subset of these features may be used, and that in other embodiments other features (e.g., snap-ins) not described herein may be implemented.

In step 605, dynamic access software element 330 receives a data packet from network layer 320. The outgoing data packet contains the MAC address specified by network layer 320; as described above, network layer 320 is bound to dynamic access software element 330 so the address specified by network layer 320 is actually the virtual MAC address (e.g., virtual MAC1 address 481 of FIG. 5D). The operations performed by dynamic access software element 330 are transparent to network layer 320, and therefore in effect network layer 320 believes it is addressing the outgoing data packet in a normal fashion. Network layer 320 utilizes a protocol such as IP, IPX, etc. Dynamic access software element 330 classifies the outgoing data packet according to the protocol being used and indicates the pointers to all of the relevant protocol headers.

In step 610, a class of service snap-in module can be used to prioritize the outgoing data packet according to the class of service specified by the user or network administrator. The outgoing data packet is placed in a queue according to its priority or is sent immediately through the remaining steps of process 600. Various class of service schemes can be implemented in accordance with the present invention.

In step 615, a snap-in module can be used to incorporate protocols being implemented by server computer system 190 (FIG. 3). These protocols include Fast IP (FIP), generic attributes registration protocol (GARP) multicast registration protocol (GMRP), and GARP VLAN registration protocol (GVRP). Various protocols can be implemented in accordance with the present invention.

In step 620, a VLAN tag is inserted into the header of the outgoing data packet. The tag corresponds to the protocol header identified in step 605.

In step 625, the trunk director detects which load balance scheme is utilized in step 630. Various load balancing schemes can be implemented in accordance with the present invention.

In step 630, the load balance scheme utilized by dynamic access software element 330 is executed. In the present embodiment, the load balance scheme is a snap-in module, and therefore different schemes can be incorporated. The load balance scheme identifies the NIC to be used to transmit the outgoing data packet.

In step 635, the fault tolerance module utilized by dynamic access software element 330 is employed. In the present embodiment, the fault tolerance module is a snap-in module and therefore different schemes can be incorporated. The fault tolerance scheme is used to determine whether the NIC selected in step 630 is functioning. The fault tolerance module monitors the NICs and maintains a list of MAC addresses for NICs that are active. The fault tolerance module dynamically adds and removes MAC addresses from the list depending on the status of each NIC. When the selected NIC is found to be disabled (e.g., it is not on the list), a different NIC is substituted from the list. It is appreciated that the fault tolerance module does not have to be in the data stream but can perform its function in the background. The fault tolerance scheme can be utilized without load balancing.

In step 640, the true MAC address corresponding to the NIC selected in steps 630 and 635 (e.g., MAC1 address 471 of FIG. 5D) is inserted into the outgoing data packet in place of the virtual MAC address initially specified by network layer 320.

In step 645, the identifier for the destination VLAN is added to the address of the outgoing data packet per IEEE standard 802.1Q. If only one VLAN is present in the network, then the outgoing data packet passes through this step without modification.

In step 650, the outgoing data packet is forwarded to the selected NIC (see steps 630 and 635), then transmitted out to and over the network. As described by step 605, the outgoing data packet is classified according to the protocol being used. Thus, in accordance with the present invention, a single NIC can have multiple protocols running over it.

Figure 7:
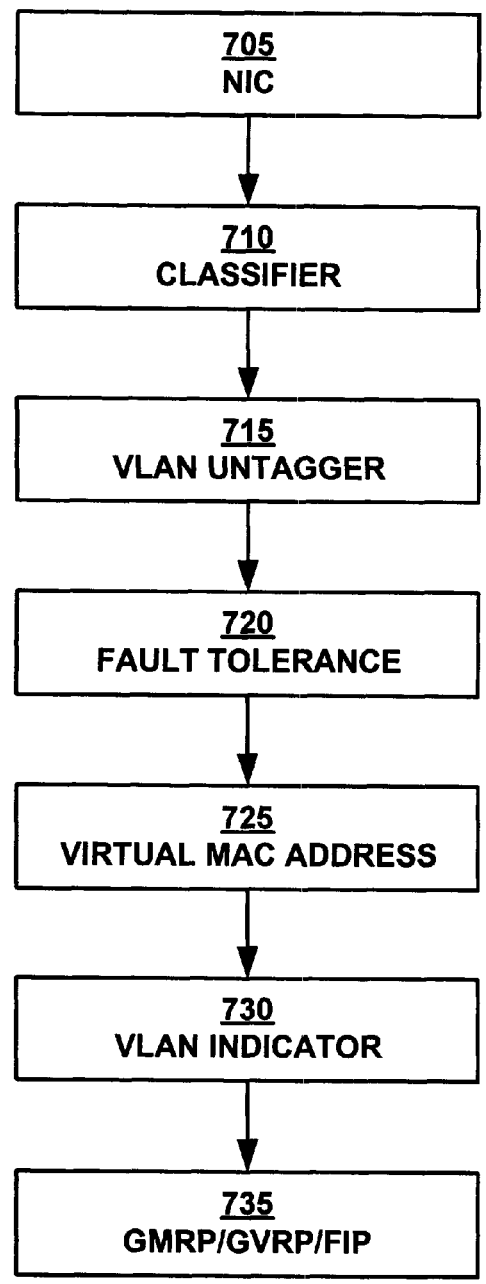
FIG. 7 is a flowchart of one embodiment of the process executed for an incoming data packet in accordance with the present invention.

FIG. 7 is a flowchart of one embodiment of process 700 executed by dynamic access software element 330 for an incoming data packet in accordance with the present invention. Process 700 includes a number of features that can be implemented by dynamic access software element 330; however, it is appreciated that in alternate embodiments a subset of these features may be used, and that in other embodiments other features (e.g., snap-ins) not described herein may be implemented.

In step 705, the incoming data packet is received at a NIC. The NIC is bound to dynamic access software element 330 (see FIG. 5D), so the incoming data packet is directly forwarded there.

In step 710, the incoming data packet is classified according to the protocol being used (e.g., IP, IPX, etc.) and the VLAN it came from. The VLAN identifier is used to determine to which virtual MAC address the incoming data packet is to proceed. Because only the VLAN identifier is examined, processing of an incoming data packet is minimized. As described by step 705, the data packet is also classified according to the protocol being used. Thus, in accordance with the present invention, a single NIC can have multiple protocols running over it.

In step 715, the VLAN identifier is removed from the incoming data packet if a VLAN identifier is present (refer to step 645 of FIG. 6).

In step 720, the fault tolerance module in the present embodiment determines whether the incoming data packet is a "keep-alive" data packet. Data packets are typically sent to determine whether the connection between a client computer system and the server computer system is still active. Also, data packets may be sent to and from the various NICs as a means for determining whether a NIC is active. These data packets contain no data and hence do not need to continue along the data path to network layer 320 (FIG. 3). Accordingly, the fault tolerance module does not forward keep-alive data packets. Otherwise, the data packet is forwarded through the remaining steps of process 700.

In step 725, the true MAC address (e.g., MAC1 address 471) is replaced with the virtual MAC address (e.g., virtual MAC1 address 481) based on the virtual MAC address selected in step 710. As explained above, the operations of dynamic access software element 330 are transparent to network layer 320. For example, an outgoing data packet may be sent out over one NIC and an incoming data packet received in response to the outgoing data packet may be received over a different NIC. However, network layer 320 is looking for the MAC address it used to address the outgoing data packet (see step 605 of FIG. 6). Thus, dynamic access software element 330 provides the MAC address that network layer 320 is expecting. In this manner, a group of NICs is represented to network layer 320 as a single NIC.

In step 730, dynamic access software element 330 determines which protocol to bind the incoming data packet to based on the classification information from step 710.

In step 735, the incoming data packet is examined by the GMRP, GVRP or FIP snap-in modules and treated accordingly if these protocols are being used. The incoming data packet is then forwarded to network layer 320 if appropriate (e.g., GMRP and GVRP data packets are not forwarded).

In summary, in one embodiment the present invention provides a method and system for fault tolerance and load balancing wherein the method and system are contained in and implemented by a server computer system. The present invention can be used with multiple NICs in a multiple VLAN environment. The present invention is used with the protocols executed by the server computer system. The present embodiment of the present invention is designed as a distinct software module that is inserted between the protocol stack (e.g., the network layer) in the server computer system and the NIC drivers. As such, the present invention is implemented without having to modify the existing protocols and software used by the server computer system. The present invention is therefore independent of the protocols being executed. In addition, the present invention is independent of the types of switches, routers, or other hardware used in the computer system network. Legacy devices and software can therefore be used with the present invention. The software solution provided by the present embodiment of the present invention minimizes costs because it is integrated at the software level and hardware modifications and upgrades are not necessary.

The use of load balancing and fault tolerance allows the spare capacity provided by the multiple NICs to be effectively utilized. It is not necessary to hold a NIC in reserve in case one of the NICs fails; instead, all NICs can be used, thereby increasing the overall performance of the server computer system and hence the network.

Additional features such as multicast registration and class of service prioritization are readily incorporated into the present embodiment of the present invention as software snap-in modules. Because the operations of the present invention are transparent to the network layer and the NICs, these features can be added without perturbing the existing software and protocols used by the server computer system.

Thus, the present invention provides a system and method that integrate fault tolerance and load balancing in a multiple VLAN environment wherein the system and method are not limited by the capabilities of a switch. The present invention also provides a system and method that are switch-independent and can be used with legacy hardware (e.g., switches and NICs). In addition, the present invention provides a system and method that can be used with the protocols used by the server computer system.

The preferred embodiment of the present invention, combining virtual local area networks and load balancing with fault tolerance in a high performance protocol, is thus described. While the present invention has been described in particular embodiments, it should be appreciated that the present invention should not be construed as limited by such embodiments, but rather construed according to the following claims.

What is claimed is:

1. In a server computer system adapted to have a plurality of network interface cards (NICs) coupled thereto, a method for sending and receiving data packets over a network of computer systems, said method comprising the computer-implemented steps of:

a) addressing an outgoing data packet using a first media access control (MAC) address and a second MAC address, wherein said first MAC address is a virtual MAC address representing said plurality of NICs and wherein said second MAC address is a virtual MAC address corresponding to a virtual local area network (VLAN) that is a destination of said outgoing data packet;

b) selecting a first NIC from said plurality of NICs using a load balancing scheme;

c) verifying functionality of said first NIC using a fault tolerance scheme;

d) replacing said first MAC address in said outgoing data packet with a MAC address representing said first NIC and replacing said second MAC address in said outgoing data packet with an identifier corresponding to said VLAN; and e) sending said outgoing data packet using said first NIC.

2. The method for sending and receiving data packets over a network of computer systems as recited in claim 1 further comprising the steps of:

f) receiving an incoming data packet at one of said plurality of NICs; and g) replacing an existing MAC address in said incoming data packet with said first MAC address.

3. The method for sending and receiving data packets over a network of computer systems as recited in claim 1 wherein said step b) comprises:
   selecting said first NIC based on a destination address specified in said outgoing data packet.

4. The method for sending and receiving data packets over a network of computer systems as recited in claim 1 wherein said step c) further comprises:
   automatically switching from said first NIC to a second NIC when said fault tolerance scheme indicates said first NIC is not available.

5. The method for sending and receiving data packets over a network of computer systems as recited in claim 1 further comprising:
   assigning a class of service priority to said outgoing data packet and placing said outgoing data packet in a queue according to said class of service priority.

6. The method for sending and receiving data packets over a network of computer systems as recited in claim 1 wherein said VLAN is compliant with the IEEE 802.1Q standard.

7. The method for sending and receiving data packets over a network of computer systems as recited in claim 1 wherein said outgoing data packet is configured according to Fast Internet Protocol (FIP).

8. The method for sending and receiving data packets over a network of computer systems as recited in claim 1 wherein said outgoing data packet is configured according to GARP (generic attributes registration protocol) multicast registration protocol (GMRP).

9. The method for sending and receiving data packets over a network of computer systems as recited in claim 1 wherein said outgoing data packet is configured according to GARP VLAN registration protocol (GVRP).

10. A server-side computer system comprising:
    a bus;
    a processor coupled to said bus; and
    a computer-readable memory unit coupled to said bus;
    said computer system adapted to have a plurality of network interface cards (NICs) coupled thereto;
    said processor for performing a method for sending and receiving data packets over a network of computer systems, said method comprising the steps of:
      a) addressing an outgoing data packet using a first media access control (MAC) address and a second MAC address, wherein said first MAC address is a virtual MAC address representing said plurality of NICs and wherein said second MAC address is a virtual MAC address corresponding to a virtual local area network (VLAN) that is a destination of said outgoing data packet;
      b) selecting a first NIC from said plurality of NICs using a load balancing scheme;
      c) verifying functionality of said first NIC using a fault tolerance scheme;
      d) replacing said first MAC address in said outgoing data packet with a MAC address representing said first NIC and replacing said second MAC address in said outgoing data packet with an identifier corresponding to said VLAN; and
      e) sending said outgoing data packet using said first NIC.

11. The computer system of claim 10 wherein said outgoing data packet is configured according to Fast Internet Protocol (FIP).

12. The computer system of claim 10 wherein said processor performs said method for sending and receiving data packets over a network of computer systems further comprising the steps of:
    f) receiving an incoming data packet at one of said plurality of NICs; and
    g) replacing an existing MAC address in said incoming data packet with said first MAC address.

13. The computer system of claim 10 wherein said processor performs said method for sending and receiving data packets over a network of computer systems wherein said step b) comprises:
    selecting said first NIC based on a destination address specified in said outgoing data packet.

14. The computer system of claim 10 wherein said processor performs said method for sending and receiving data packets over a network of computer systems wherein said step c) further comprises:
    automatically switching from said first NIC to a second NIC when said fault tolerance scheme indicates said first NIC is not available.

15. The computer system of claim 10 wherein said processor performs said method for sending and receiving data packets over a network of computer systems further comprising:
    assigning a class of service priority to said outgoing data packet and placing said outgoing data packet in a queue according to said class of service priority.

16. The computer system of claim 10 wherein said VLAN is compliant with the IEEE 802.1Q standard.

17. The computer system of claim 10 wherein said outgoing data packet is configured according to GARP VLAN registration protocol (GVRP).

18. The computer system of claim 10 wherein said outgoing data packet is configured according to GARP (generic attributes registration protocol) multicast registration protocol (GMRP).

19. A computer-usable medium having computer readable program code embodied therein for causing a server-side computer system adapted to have a plurality of network interface cards (NICs) coupled thereto to perform the steps of:
    a) addressing an outgoing data packet using a first media access control (MAC) address and a second MAC address, wherein said first MAC address is a virtual MAC address representing said plurality of NICs and wherein said second MAC address is a virtual MAC address corresponding to a virtual local area network (VLAN) that is a destination of said outgoing data packet;
    b) selecting a first NIC from said plurality of NICs using a load balancing scheme;
    c) verifying functionality of said first NIC using a fault tolerance scheme;
    d) replacing said first MAC address in said outgoing data packet with a MAC address representing said first NIC and replacing said second MAC address in said outgoing data packet with an identifier corresponding to said VLAN; and
    e) sending said outgoing data packet using said first NIC.

20. The computer-usable medium of claim 19 wherein said outgoing data packet is configured according to Fast Internet Protocol (FIP).

21. The computer-usable medium of claim 19 wherein said outgoing data packet is configured according to GARP VLAN registration protocol (GVRP).

22. The computer-usable medium of claim 19 wherein said computer-readable program code embodied therein causes a server-side computer system to perform the steps of:

f) receiving an incoming data packet at one of said plurality of NICs; and g) replacing an existing MAC address in said incoming data packet with said first MAC address.

23. The computer-usable medium of claim 19 wherein said computer-readable program code embodied therein causes a server-side computer system to perform the step of:

selecting said first NIC based on a destination address specified in said outgoing data packet.

24. The computer-usable medium of claim 19 wherein said computer-readable program code embodied therein causes a server-side computer system to perform the step of:

automatically switching from said first NIC to a second NIC when said fault tolerance scheme indicates said first NIC is not available.

25. The computer-usable medium of claim 19 wherein said computer-readable program code embodied therein causes a server-side computer system to perform the step of:

assigning a class of service priority to said outgoing data packet and placing said outgoing data packet in a queue according to said class of service priority.

26. The computer-usable medium of claim 19 wherein said VLAN is compliant with the IEEE 802.1Q standard.

27. The computer-usable medium of claim 19 wherein said outgoing data packet is configured according to GARP (generic attributes registration protocol) multicast registration protocol (GMRP).

* * * * *